United States Patent [19]

Matsushita et al.

[11] Patent Number: 5,535,830

[45] Date of Patent: Jul. 16, 1996

[54] DOZING CONTROL UNIT FOR A BULLDOZER

[75] Inventors: Shigenori Matsushita; Shigeru Yamamoto; Shu H. Zhang, all of Hirakata, Japan

[73] Assignee: Kabushiki Kaisha Komatsu Seisakusho, Tokyo, Japan

[21] Appl. No.: 231,676

[22] Filed: Apr. 25, 1994

[30] Foreign Application Priority Data

Apr. 27, 1993 [JP] Japan ...................................... 5-101355

[51] Int. Cl.⁶ .................................................. A01B 63/112
[52] U.S. Cl. ........................... 172/7; 172/4.5; 364/424.07
[58] Field of Search ................................. 172/2, 3, 4.5, 7, 172/9, 11, 12; 364/424.07

[56] References Cited

U.S. PATENT DOCUMENTS 4,630,685 12/1986 Huck, Jr. et al. .
5,219,411 6/1993 Yamamoto et al. ................. 172/4.5 X

FOREIGN PATENT DOCUMENTS

| 53-5441 | 2/1978 | Japan . |
| 53-6967 | 2/1978 | Japan . |
| 55-36776 | 2/1980 | Japan . |
| 63-31618 | 6/1988 | Japan . |
| 1-62525 | 3/1989 | Japan . |
| 3-43523 | 2/1991 | Japan . |
| 6-3886 | 2/1994 | Japan . |
| 92018706 | 10/1992 | WIPO . |

*Primary Examiner*—Terry Lee Melius
*Assistant Examiner*—Victor Batson
*Attorney, Agent, or Firm*—Armstrong, Westerman, Hattori, McLeland & Naughton

[57] ABSTRACT

A dozing control unit for a bulldozer, comprising an actual tractive force detector for detecting the actual tractive force of a vehicle body; a driving mode selector button capable of switching a manual operation mode to an automatic driving mode in dozing operation; and a blade controller for controlling a blade to be lifted or lowered such that if there is a difference between the actual tractive force detected by the actual tractive force detector and a target tractive force set for the automatic driving mode when the manual operation mode is switched to the automatic driving mode by the driving mode selector button, the actual tractive force gradually comes closer to the target tractive force.

16 Claims, 9 Drawing Sheets

DOZING CONTROL UNIT FOR A BULLDOZER

BACKGROUND OF THE INVENTION (1) Field of the Invention

The present invention relates to a dozing control unit for a bulldozer. In particular, the invention relates to techniques for controlling loads which are applied to the blade of a bulldozer during digging and carrying in dozing operation.

(2) Description of the Prior Art

Dozing operation by the use of a bulldozer has been previously performed in such a way that by fully manual operation of the operator who drives a bulldozer a blade to be lifted or lowered is operated so that the loads applied to the blade during digging and carrying can be kept substantially constant.

SUMMARY OF THE INVENTION

Such manual operation for lifting or lowering a blade so as to keep the loads on the blade substantially constant for getting good efficiency and, moreover, smooth dozing, has the disadvantage that it brings tremendous fatigue to the operator, even if he is very skillful, since he has to carry out lifting/lowering operation a number of times. Another disadvantage is that the above operation itself is very complicated and difficult to carry out not only for unskilled operators who soon get exhausted but also for experienced operators.

The invention has been made in order to overcome the above disadvantages and an object of the invention is therefore to provide a dozing control unit for a bulldozer with which dozing can be easily, efficiently and, most of all, smoothly carried out by a simple operation without causing a great deal of fatigue to the operator.

In order to accomplish the above object, a dozing control unit for a bulldozer according to the invention comprises:

(a) actual tractive force detector means for detecting an actual tractive force of a vehicle body;

(b) driving mode switching means capable of switching from a manual operation mode to an automatic driving mode in dozing operation; and (c) blade controller means for controlling a blade to be lifted or lowered such that if there is a difference between the actual tractive force detected by the actual tractive force detector means and a target tractive force set for the automatic driving mode when the manual operation mode is switched to the automatic driving mode by the driving mode switching means, the actual tractive force gradually comes closer to the target tractive force.

In the dozing control unit of the invention, when the manual operation mode is switched to the automatic driving mode in dozing operation by the driving mode switching means, if there is a difference between an actual tractive force detected by the actual tractive force detector means and a target tractive force which is set in accordance with soil property etc., the blade is controlled to be lifted or lowered by the blade controller means such that the actual tractive force gradually becomes equal to the target tractive force, whereby the load applied to the blade during digging or carrying can be kept constant.

With such an arrangement, the blade can be automatically lifted or lowered such that the magnitude of a load applied to the blade by digging or carrying becomes equal to a certain value corresponding to a target tractive force, so that dozing can be efficiently carried out by a simple operation without causing tremendous fatigue to the operator. Further, when the driving mode is switched to the automatic driving mode, if there is a difference between an actual tractive force and a target tractive force set for the automatic driving mode, the actual tractive force gradually becomes equal to the target tractive force, whereby smooth dozing operation can be achieved.

The automatic driving mode may be an automatic digging mode that is associated with digging in dozing operation or an automatic carrying mode that is associated with carrying in dozing operation. As the automatic driving mode, there may be provided in dozing operation at least the automatic digging mode associated with digging and the automatic carrying mode associate with carrying in dozing operation.

Preferably, a target tractive force for the automatic carrying mode is set a predetermined amount smaller than a target tractive force for the automatic digging mode. With this arrangement, when the automatic digging mode is selected, with a load corresponding to a great target tractive force, a large volume of ground can be dug. On the other hand, when the automatic carrying mode is selected, with a load corresponding to a small target tractive force, a small volume of ground is dug whereby a large amount of soil can be carried so that little soil is fallen down from the blade. Accordingly, efficient dozing operation can be achieved.

For setting a target tractive force for the automatic driving mode, the dozing control unit is preferably equipped with a target tractive force setting means comprising, for example, a dial switch or ten key switch. For example, a target tractive force setting means for setting a target tractive force for the automatic digging mode and a target tractive force setting means for setting a target tractive force for the automatic carrying mode may be independently provided. Alternatively, the dozing control unit may be designed such that a target tractive force setting means for setting a target tractive force for the automatic digging mode is provided and a tractive force obtained by subtracting the before-mentioned predetermined amount from a target tractive force set by the above means for the automatic digging mode is automatically set as a target tractive force for the automatic carrying mode. Vice versa, it is also possible that a target tractive force setting means for setting a target tractive force for the automatic carrying mode is provided and a tractive force obtained by adding the before mentioned predetermined amount to a target tractive force set by the above means for the automatic carrying mode is automatically set as a target tractive force for the automatic digging mode.

Detection of an actual tractive force by the actual tractive force detector means is performed in either of the following ways.

1. An engine revolution sensor for detecting a revolution speed Ne of an engine and a torque convertor output shaft revolution sensor for detecting a revolution speed Nt of an output shaft of a torque convertor are employed. Speed ratio e (= Nt/Ne), which is the ratio of the engine revolution speed Ne detected by the engine revolution sensor to the torque convertor output shaft revolution speed Nt detected by the torque convertor output shaft revolution sensor, is first obtained. Then, the torque convertor output torque is obtained from the torque convertor characteristic of the torque convertor, using the speed ratio e. The torque convertor output torque is then multiplied basically by the reduction ratio between the output shaft of the torque convertor and sprockets for driving the crawler belts used for running the vehicle body, whereby the actual tractive force of the vehicle body is detected.

2. An engine revolution sensor for detecting a revolution speed of an engine is used, when the torque convertor equipped with a lock-up mechanism is selected to "locked-up" or when a direct transmission is employed. Engine torque is obtained from the engine torque characteristic of the engine, using the revolution speed of the engine detected by the engine revolution sensor. Then, the engine torque is multiplied basically by the reduction ratio between the engine and the sprockets for driving the crawler belts used for running the vehicle body, and accordingly, the actual tractive force of the vehicle body is detected.

The actual tractive force detector means may be equipped with a pitch angle sensor for detecting a pitch angle of the vehicle body inclining in forward and backward directions and the actual tractive force which has been detected by the detector means may be corrected in accordance with the pitch angle detected by the pitch angle sensor. This allows the load applied to the blade during digging or carrying to be maintained constant irrespective of running resistance which is dependent on the pitch angle of the vehicle body, that is, the angulation of the ground where the vehicle runs.

The driving mode switching means may comprise a push button selector switch, a grip-type selector switch, a twisting-type selector switch or a rotary selector switch.

The control of lifting or lowering the blade executed by the blade controller means is not performed when the blade is in manual operation, but performed when the blade is in the automatic driving mode and the first forward speed or an intermediate forward speed is selected. This makes it possible to perform automatic driving only when a speed suitable for dozing operation such as the first forward speed or an intermediate forward speed is selected in the automatic driving mode. The manual operation of the blade is carried out in preference to the automatic driving operation and, therefore, can be performed any time at will, by interposing it in the course of automatic driving.

Other objects of tile present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIGS. 1 to 10 illustrate a preferred embodiment of a dozing control unit for a bulldozer according to the invention;

FIGS. 4A, 4B-1 and 4B-2 show a partial flow chart of a dozing program;

FIG. 4B shows a legend designating the arrangement of FIGS. 4B-1 and 4B-2;

PREFERRED EMBODIMENTS OF THE INVENTION

With reference to the drawings, a dozing control unit for a bulldozer according to a preferred embodiment of the invention will be hereinafter described.

Figure 1:
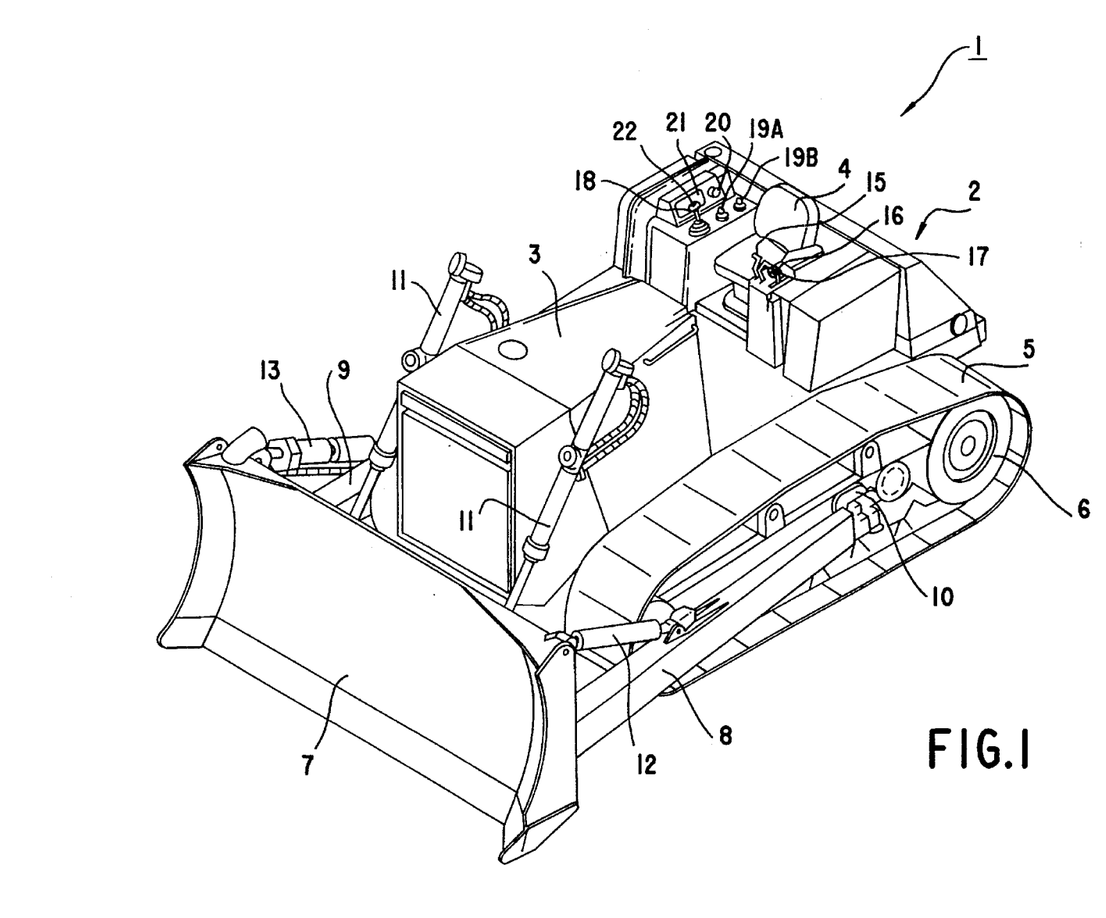
FIG. 1 is an external appearance of the bulldozer.

Referring to FIG. 1, there is shown the external appearance of a bulldozer 1 which is provided with, on a vehicle body 2 thereof, a bonnet 3 for housing an engine (not shown) and an operator seat 4 for the operator who drives the bulldozer 1. Both sides (i.e., the right and left sides of the vehicle body 2 when viewed in its moving direction) of the vehicle body 2 are provided with crawler belts 5 (the crawler belt on the right side is not shown) for running the vehicle body 2 so as to turn or move back and forth. Each of these crawler belts 5 are independently driven by their respective sprockets 6 actuated by driving force transmitted from the engine.

There are provided straight frames 8, 9 for supporting a blade 7 at the forward ends thereof. The base ends of these right and left straight frames 8, 9 are pivotally supported at the right and left sides of the vehicle body 2 by means of trunnions 10 (the trunnion on the right side is not shown) in such a manner that the blade 7 can be lifted or lowered. Disposed between the blade 7 and the vehicle body 2 are right and left blade lift cylinders 11 forming a pair for lifting or lowering the blade 7. For functioning to incline the blade 7 to the right and left, a brace 12 is disposed between the blade 7 and the left straight frame 8 and a blade tilt cylinder 13 is disposed between the blade 7 and the right straight frame 9.

There are provided a steering lever 15, a transmission shift lever 16 and a fuel control lever 17 on the left of the operator seat 4 when the vehicle body 2 is viewed in its moving direction. On the right of the operator seat 4, there are provided a blade control lever 18 for lifting, lowering the blade 7 and inclining it to the right and left; a first dial switch 19A for setting a load to be applied to the blade 7 and a second dial switch 19B for correcting the set load by adding or subtracting a correction value; and a lock-up selector switch 20 for bringing a torque convertor into a locked-up state and releasing the torque convertor from the locked-up state; and a display unit 21. At the top of the blade control lever 18, a driving mode selector button 22 for switching a driving mode in dozing operation and so on is provided. According to how many times the driving mode selector button 22 is pressed, the driving mode sequentially switches between a manual operation mode, an automatic digging mode or an automatic carrying mode in dozing operation. Although they are not shown in the drawing, a brake pedal and a decelerator pedal are disposed in front of the operator seat 4.

Figure 2:
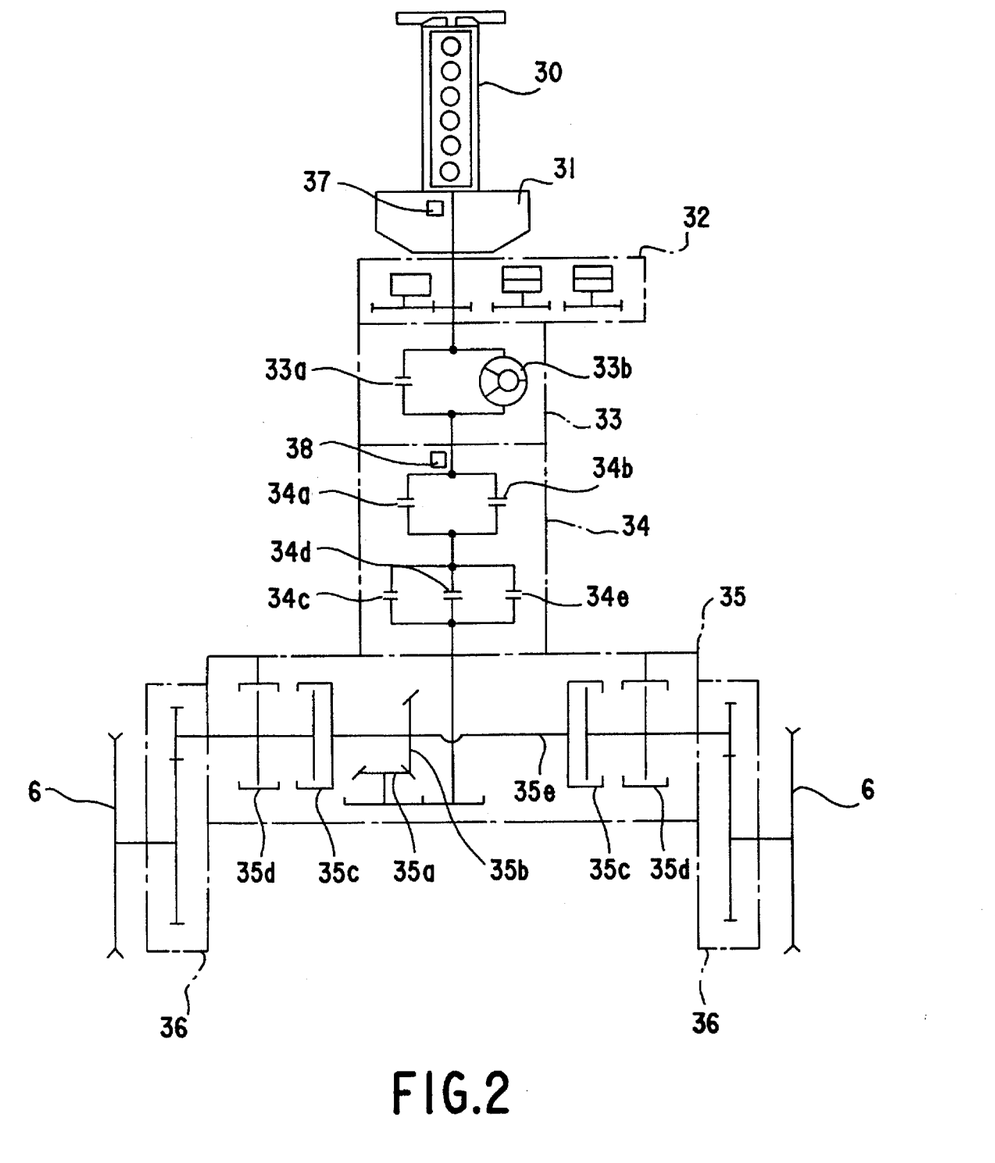
FIG. 2 is a skeleton diagram of a power transmission system.

Referring to FIG. 2 which shows a power transmission system, rotary driving force from an engine 30 is transmitted to a torque convertor with a lock-up mechanism 33 through a damper 31 and a PTO 32. The torque convertor with a lock-up mechanism 33 includes a lock-up mechanism 33a and a pump 33b, and the PTO 32 functions to drive various hydraulic pumps including hydraulic pumps for operational machines. The rotary driving force is then transmitted from an output shaft of the torque convertor with a lock-up mechanism 33 to a transmission 34 such as, for example, a planetary gear lubricated multiple-disc clutch transmission, an input shaft of which is connected to the above output shaft. The transmission 34 includes forward and reverse clutches 34a, 34b and first to third clutches 34c to 34e so that the revolution of the output shaft of the transmission 34 can be shifted in three ranges in both forward and backward directions. The rotary driving force from the output shaft of the transmission 34 is transmitted to a steering mechanism 35 that includes a pinion 35 and a transverse shaft 35e on which disposed are a bevel gear 35b, right and left steering clutches 35c forming a pair, and right and left steering brakes 35d forming a pair. Thereafter, the rotary driving force is transmitted to a pair of final reduction mechanisms 36 disposed on the right and left hands so that each of the sprockets 6 for running the crawler belts 5 is driven. Reference numeral 37 denotes an engine revolution sensor for detecting the revolution speed of the engine 30 and reference numeral 38 denotes a torque convertor output shaft revolution sensor for detecting the revolution speed of the output shaft of the torque convertor with a lock-up mechanism 33.

Figure 3:
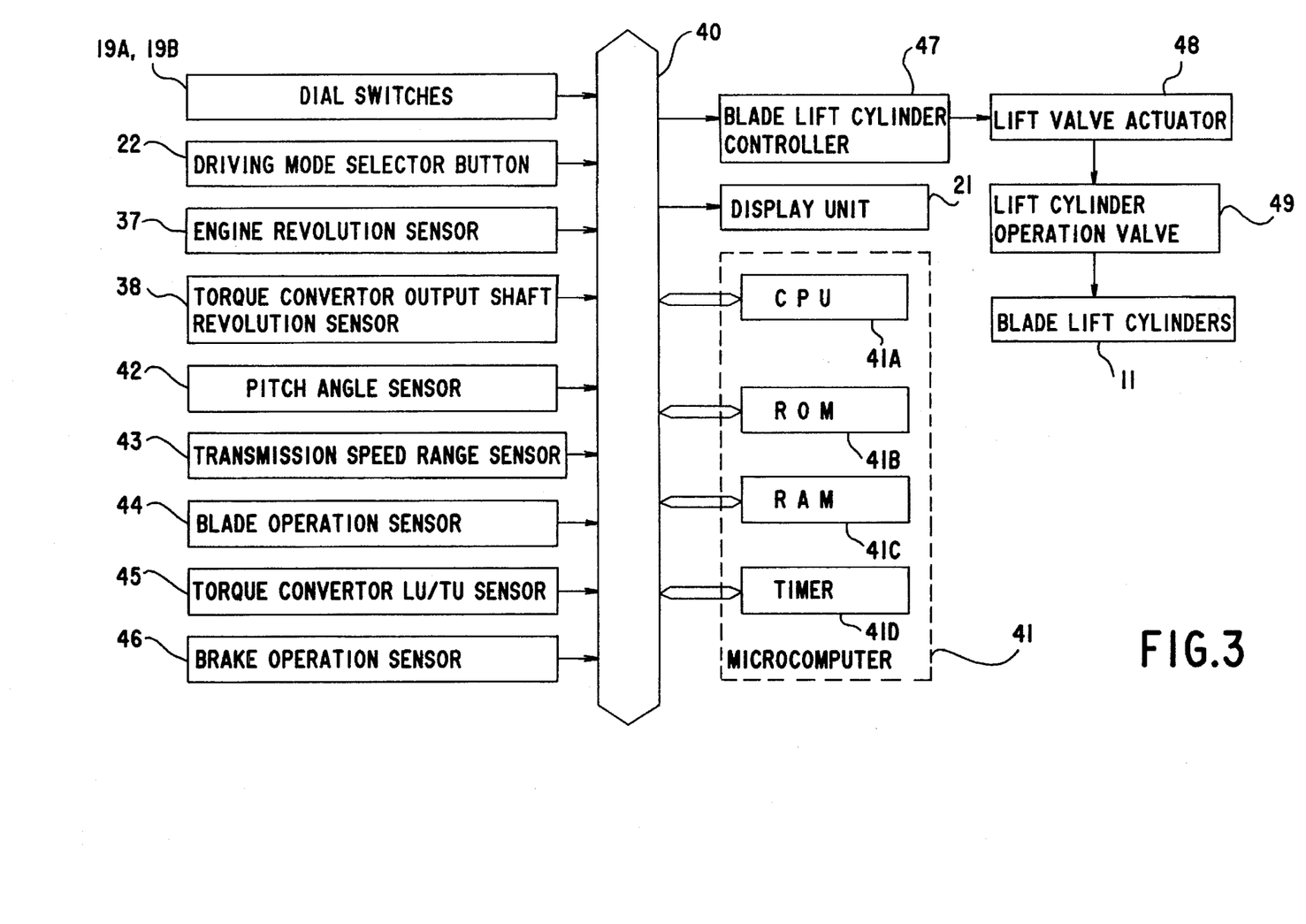
FIG. 3 is a schematic block diagram of the overall construction of the dozing control unit.

Referring to FIG. 3 which schematically shows the overall construction of the dozing control unit for a bulldozer of the invention, the following data items are supplied to a microcomputer 41 through a bus 40: (i) dial value data sent from the first dial switch 19A, regarding the magnitude of a load applied to the blade 7, which load is set by the first dial switch 19A; (ii) dial value data sent from the second dial switch 19B, regarding a correction value to be added to or subtracted from the set load; (iii) data on pressing operation condition of the driving mode selector button 22 for switching between the manual operation mode, automatic digging mode or automatic carrying mode and so on in dozing operation; (iv) revolution speed data from the engine revolution sensor 37, regarding the revolution speed of the engine 30; and (v) revolution speed data from the torque convertor output shaft revolution sensor 38, regarding the revolution speed of the output shaft of the torque convertor 33. The following data and so on are also supplied to the microcomputer 41 through the bus 40: (i) pitch angle data sent from a pitch angle sensor 42 that detects the momentarily varying pitch angle of the vehicle body 2 inclining in forward and backward directions; (ii) data from a transmission speed range sensor 43 that detects speed range selecting conditions of the transmission 34 on selecting speed ranges by operating the transmission shift lever 16; (iii) data from a blade operation sensor 44 that detects whether or not the blade 7 is manually operated by the blade control lever 18; (iv) data from a torque convertor LU/TC sensor 45 that detects lock-up (LU)/torque converting (TC) changing conditions of the torque converter 33 on switching lock-up (LU) state, these conditions being switched by switching the lock-up state of the torque convertor 33 with the lock-up selector switch 20; (v) data from a brake operation sensor 46 that detects whether or not the brake is operated by pressing the brake pedal.

The microcomputer 41 is composed of a central processing unit (CPU) 41A for executing a specified program; a read only memory (ROM) 41B for storing the above program and various maps such as a curved engine characteristic map and curved torque convertor characteristic map; a random access memory (RAM) 41C serving as a working memory necessary for executing the program and as registers for various data; and a timer 41D for measuring elapsed time for an event in the program. The program is executed in accordance with (i) the dial value data on the set load to be applied to the blade 7; (ii) the dial value data on the correction value to be added to or subtracted from the set load; (iii) the data on pressing operation conditions of the driving mode selector button 22; (iv) the data on the revolution speed of the engine 30; (v) the data on the revolution speed of the output shaft of the torque convertor 33; (vi) the data on the pitch angle of the vehicle body 2 in forward and backward directions; (vii) the data on speed range selecting conditions in the transmission 34; (viii) data on whether or not the blade 7 is in manual operation; (ix) data on lock-up (LU)/torque converting (TC) changing conditions of the torque converter 33; and (x) data on whether or not the brake is in operation. Then, data on the lift operation amount for lifting or lowering the blade 7 is supplied to a blade lift cylinder controller 47, and the right and left blade lift cylinders 11 are driven based on the lift operation amount by means of the controller 47 with the help of a lift valve actuator 48 and a lift cylinder operation valve 49, whereby the blade 7 is lifted or lowered. The display unit 21 displays information such as whether the bulldozer 1 is presently in the manual operation mode, automatic digging mode or automatic carrying mode and so on in dozing operation.

Figure 4A:
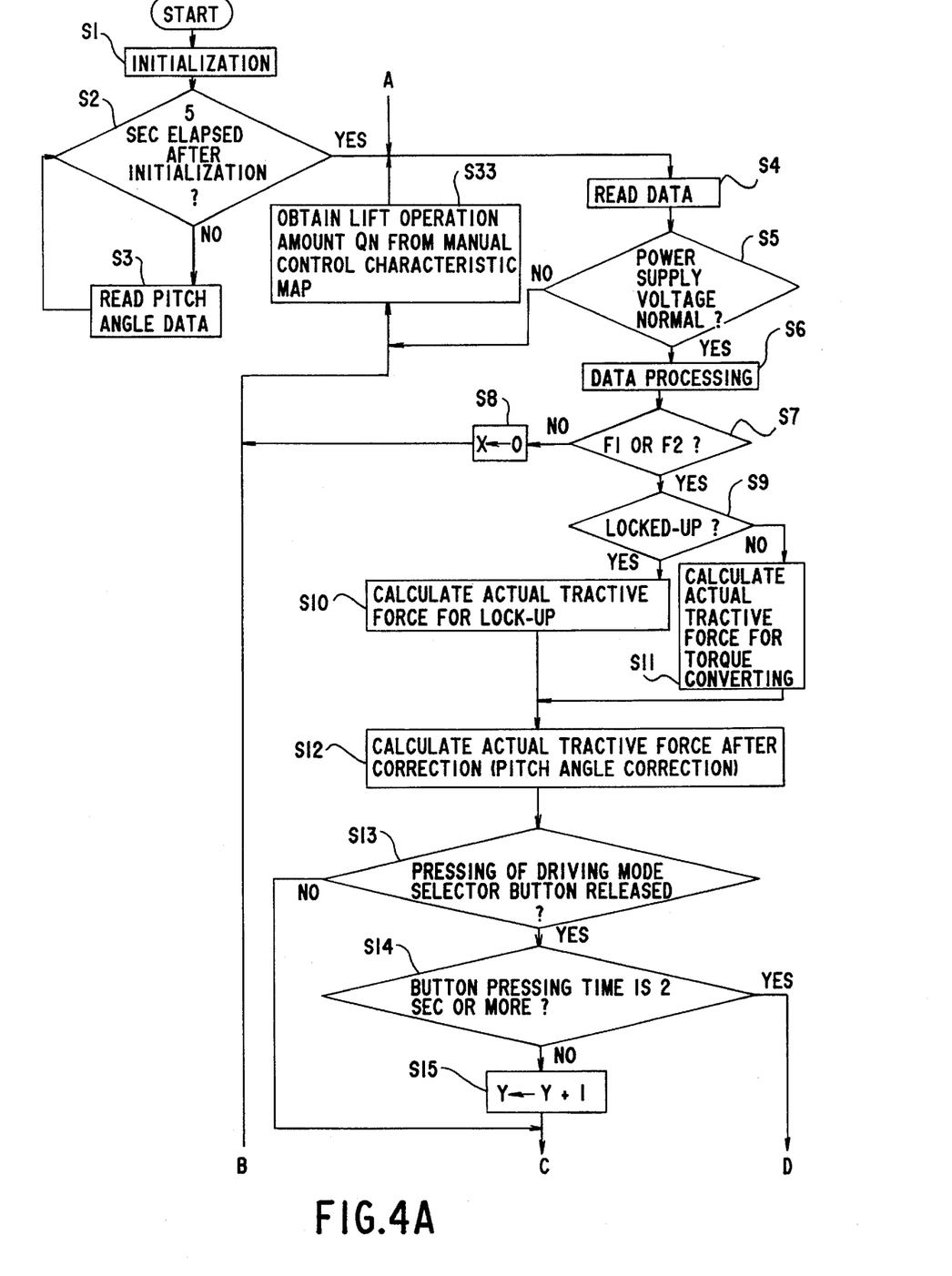
Figures 4B, 4B:
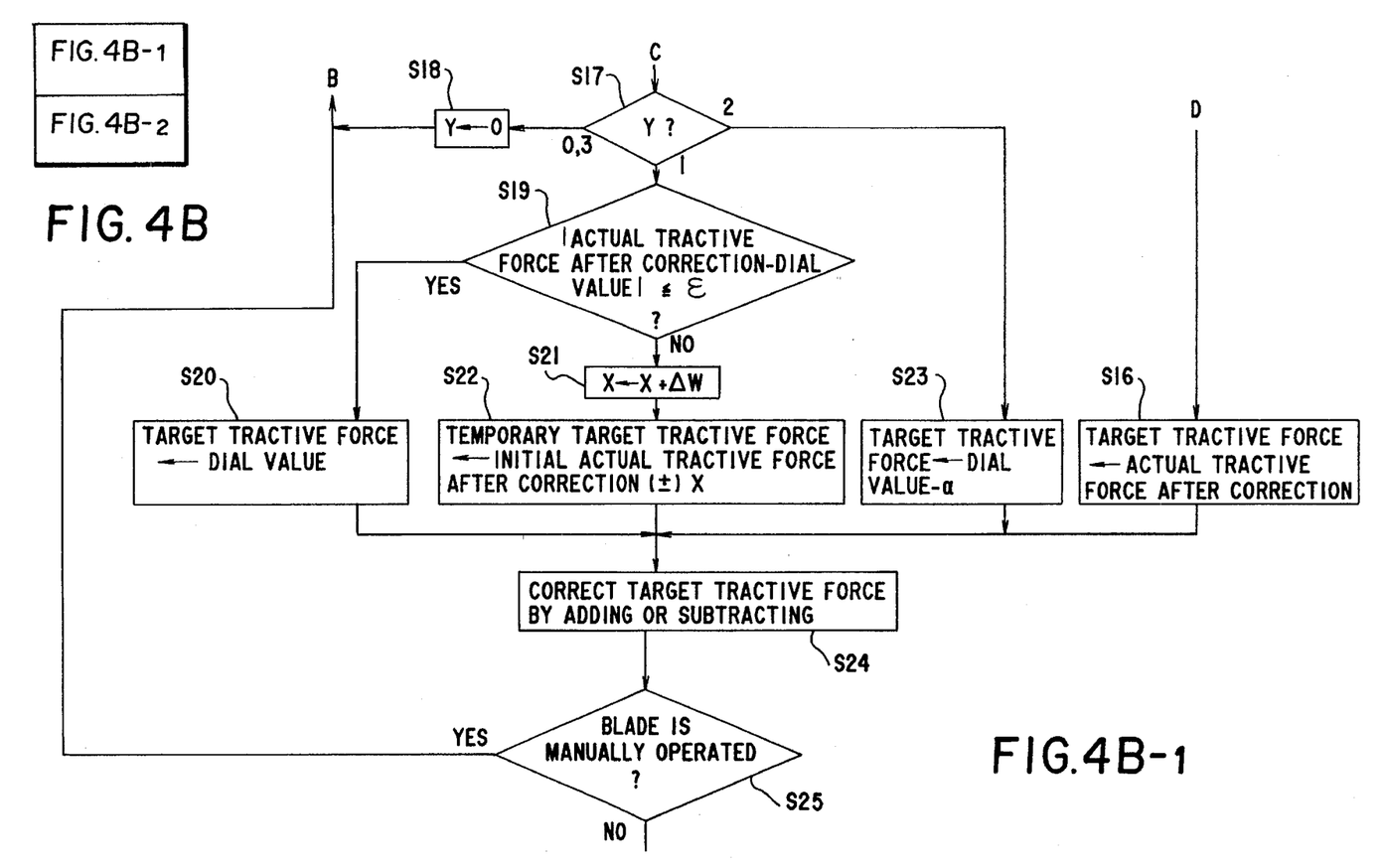
Figure 4B:
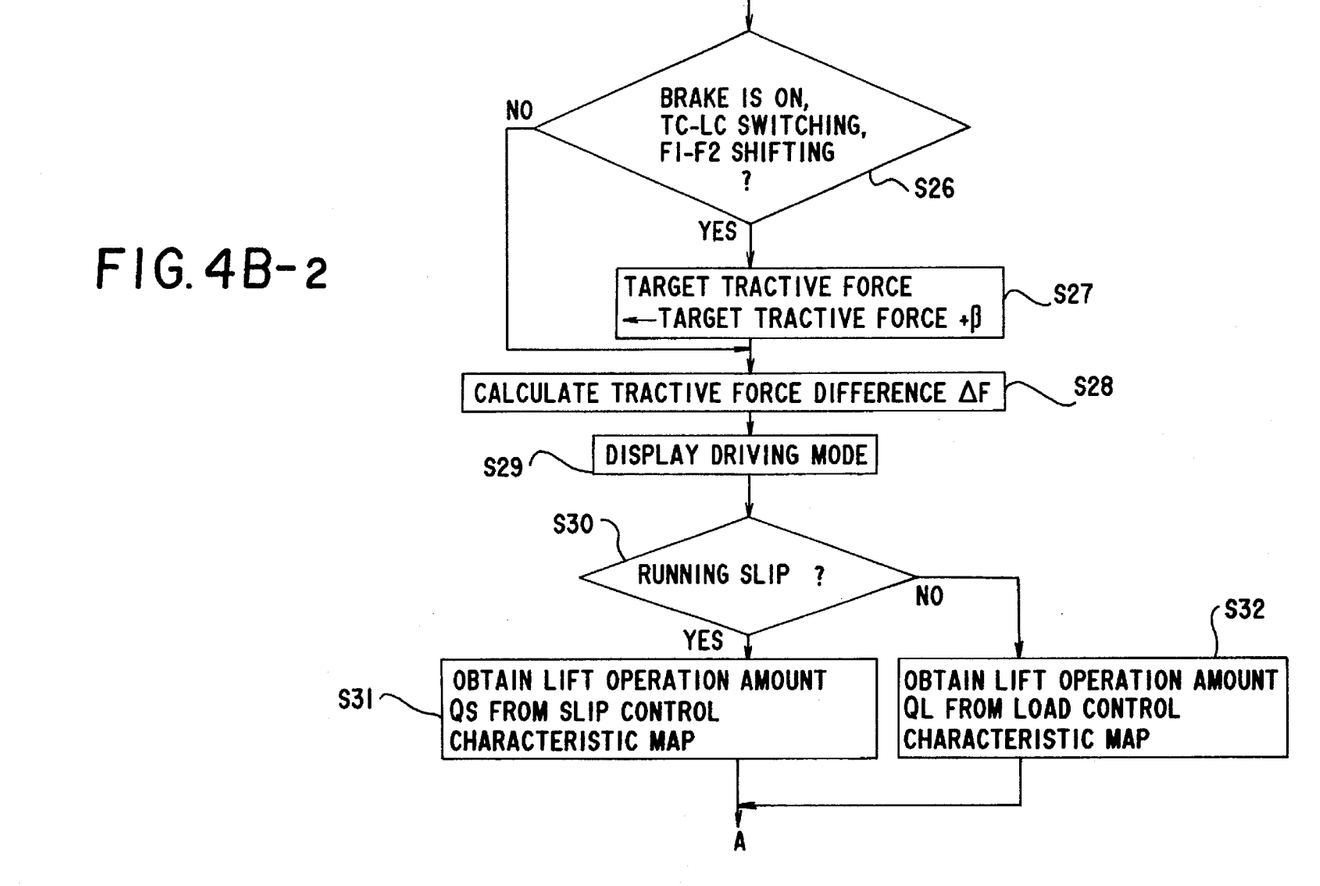

Now reference is made to the flowchart of FIGS. 4A, 4B-1, 4B-2 for describing, in detail, the performance of the dozing control unit for a bulldozer having the above-described construction.

Step 1 to Step 3: Power is loaded to start execution of the specified program and to execute initialization by clearing all the data of the registers and so on in the RAM 41C of the microcomputer 41. For a specified time (5 seconds in this embodiment) after the initialization, pitch angle data are sequentially read from the pitch angle sensor 42 as initial values. The reason why pitch angle data are sequentially read as initial values is that the pitch angle of the vehicle body 2 is obtained by frequency separation using the moving average of the pitch angle data.

Step 4 to Step 6: The following data are firstly read: (i) the dial value data sent from the first dial switch 19A, regarding a set load to be applied to the blade 7; (ii) the dial value data sent from the second dial switch 19B, regarding a correction value to be added to or subtracted from the set load; (iii) the data from the driving mode selector button 22, regarding pressing operation conditions; (iv) the data from the engine revolution sensor 37, regarding the revolution speed of the engine 30; (v) the data from the torque convertor output shaft revolution sensor 38, regarding the revolution speed of the output shaft of the torque convertor 33; (vi) the data from the pitch angle sensor 42, regarding the pitch angle of the vehicle body 2 in forward and backward directions; (vii) the data from the transmission speed range sensor 43, regarding a speed range selecting conditions; (viii) the data from the blade operation sensor 44, regarding whether or not the blade 7 is in manual operation; (ix) the data from the torque LU/TC sensor 45, regarding lock-up (LU)/torque converting (TC) conditions of the torque converter 33; and (x) the data from the brake operation sensor 46, regarding whether or not the brake is in operation. Then, if the voltage of the power source is normal, i.e., more than a specified value and the electronic circuit and so on is in a normal driving condition, the following data processing is executed.

1. Low frequency components are derived from the sequentially read pitch angle data by frequency separation, utilizing the method of moving averages, whereby the pitch angle of the vehicle body 2 is obtained.

2. Then, acceleration components are derived by frequency separation, specifically, by subtracting the above low frequency components from the pitch angle data sequentially read, whereby the acceleration of the vehicle body 2 is obtained.

Step 7 to Step 12: When the speed range selected in the transmission 34 is the first forward speed (F1) or the second forward speed (F2), an actual tractive force $F_R$ is calculated in either of the following methods selected depending on whether the torque converter 33 is in the state of "locked-up" or "torque converting".

1. "Locked-up"

Figure 5:
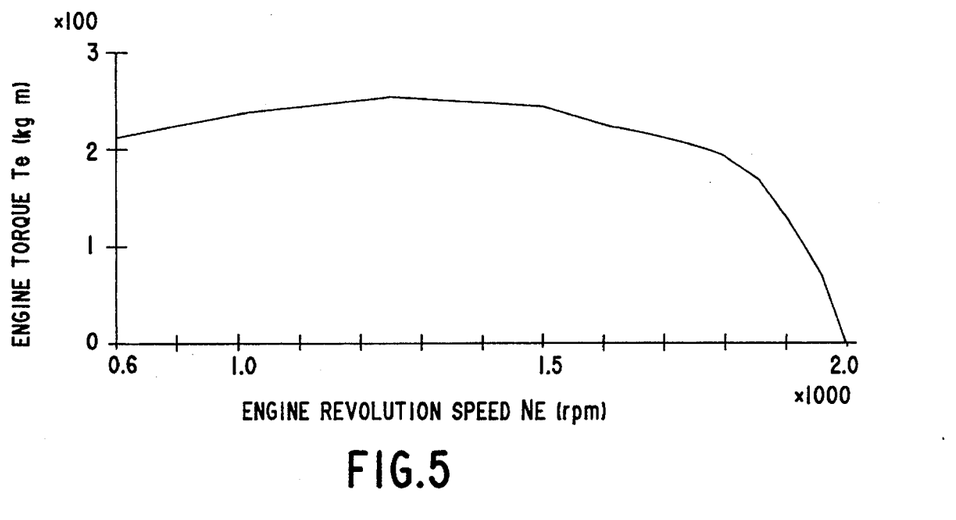
FIG. 5 is a graph showing an engine characteristic curve.
Figure 6:
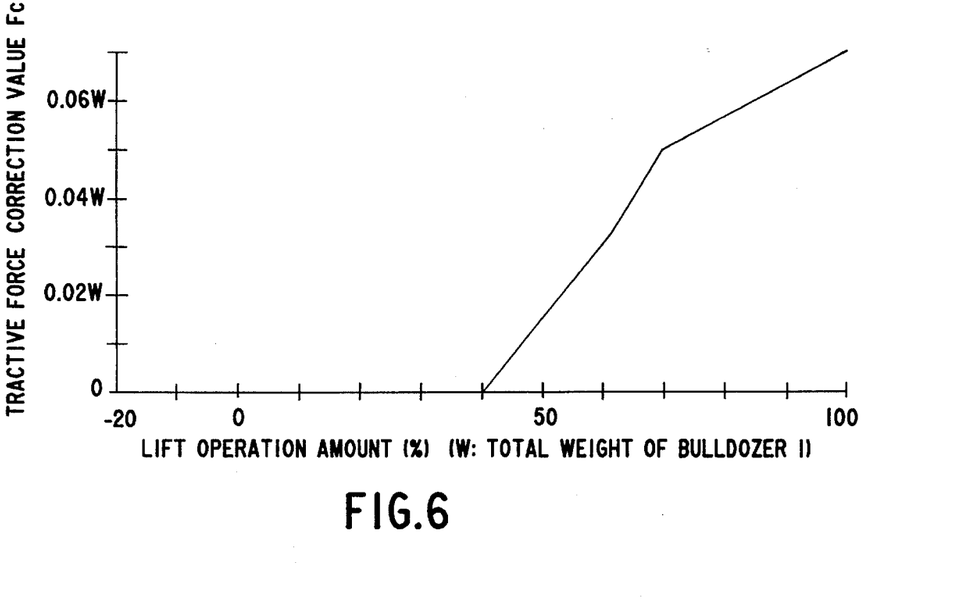
FIG. 6 is a graph showing a pump correction characteristic line.

Engine torque Te is obtained from the curved engine characteristic map as shown in FIG. 5, using the revolution speed Ne of the engine 30. Then, the engine torque Te is multiplied by a reduction ratio $k_{se}$ provided over the range of the transmission 34, the steering mechanism 35 and the final reduction mechanisms 36 (in other words, the reduction ratio between the output shaft of the torque convertor 33 and the sprockets 6) and further multiplied by the diameter r of the sprocket 6, to thereby obtain a tractive force Fe (=Te× $k_{se}$×r). A tractive force correction value Fc is subtracted from the tractive force Fe, thereby obtaining an actual tractive force $F_R$ (=Fe - Fc). The tractive force correction value Fc corresponds to the consumption amount of the hydraulic pumps including operation pumps working on the blade lift cylinders 11 and so on in the PTO 32, and can be obtained from the pump correction characteristic map as shown in FIG. 6, using the lift operation amount of the blade 7.

2. "Torque converting"

Figure 7:
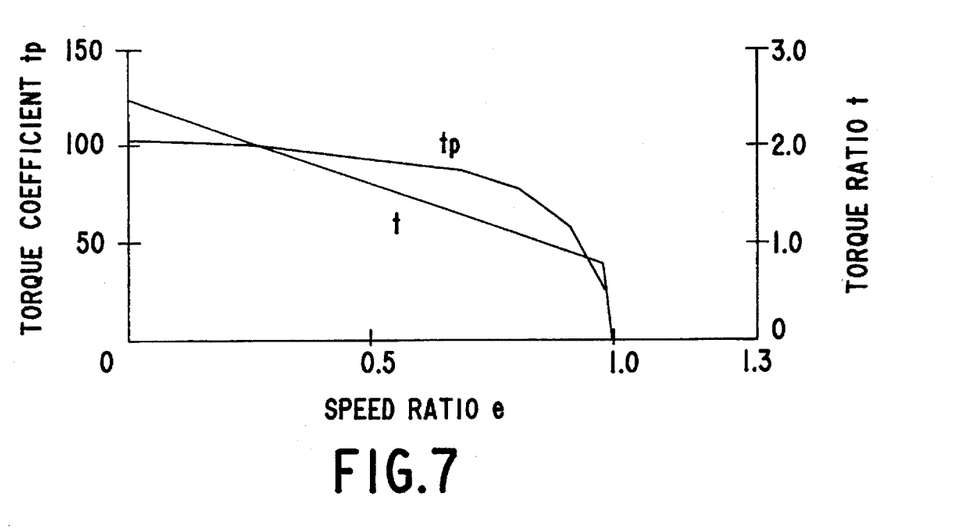
FIG. 7 is a graph showing a torque converter characteristic curve.

A torque coefficient $t_p$ and torque ratio t are obtained from the curved torque convertor characteristic map as shown in FIG. 7, using the speed ratio e (= Nt/Ne) that is the ratio of the revolution speed Ne of the engine 30 to the revolution speed Nt of the output shaft of the torque convertor 33, and then torque convertor output torque Tc (=$t_p$×(Ne/1000)$^2$×t) is obtained. Like the case 1, the torque convertor output torque Tc is multiplied by the reduction ratio $k_{se}$ between the output shaft of the torque convertor 33 and the sprockets 6 and further multiplied by the diameter r of the sprocket 6, to thereby obtain an actual tractive force $F_R$ (=Tc×$k_{se}$×r).

Figure 8:
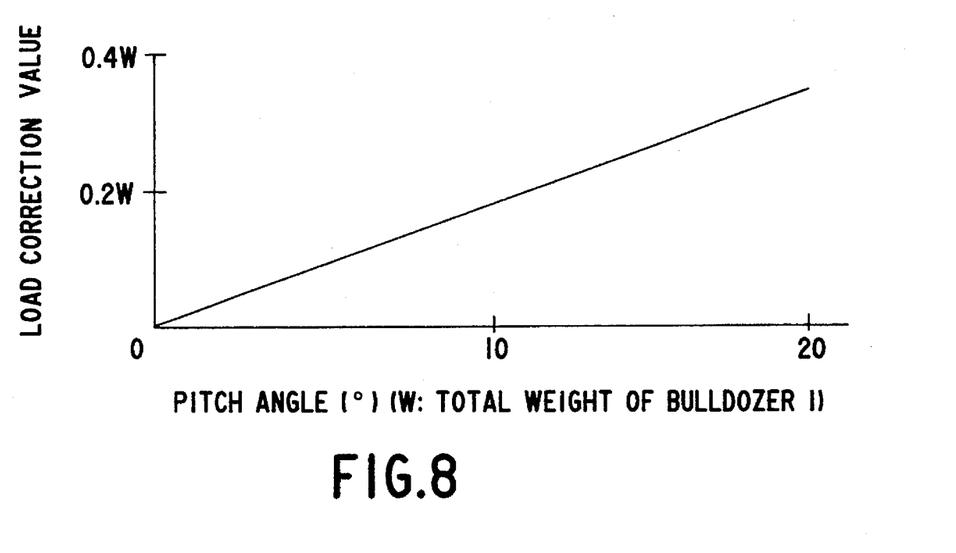
FIG. 8 is a graph showing a pitch angle-load correction value characteristic line.

A load correction value, which corresponds to the pitch angle of the vehicle body 2 and can be obtained from the pitch angle-load correction value characteristic map as shown in FIG. 8, is subtracted from the actual tractive force $F_R$ thus obtained, thereby obtaining an actual tractive force after correction F.

If the speed range selected in the transmission 34 is neither the first forward speed (F1) nor the second forward speed (F2), a cumulative value X which is used for calculation is set to "0" so that the actual tractive force gradually comes closer to a target tractive force which corresponds to the dial value set by the first dial switch 19A for determining the magnitude of a load on the blade 7 when the automatic digging mode is selected.

Step 13 to Step 16: After the driving mode selector button 22 has been released from a pressed condition, either of the following steps will be taken.

1. If time taken for pressing the driving mode selector button 22 is 2 seconds or more in this embodiment, the actual tractive forces after correction F obtained during the pressing operation are averaged and this averaged value is set as a target tractive force $F_0$.

2. If time taken for pressing the driving mode selector button 22 is less than 2 seconds, "1" is added to the number of pressing operations Y for the driving mode selector button 22.

Step 17 to Step 23: If the number of pressing operations Y for the driving mode selector button 22 is 0 or 3, it is determined that the manual operation mode is selected. If the number Y is 1, it is determined that the automatic digging mode is selected and if the number Y is 2, it is determined that the automatic carrying mode is selected. Then, either of the following steps is carried out.

1. Where the manual operation mode is selected:

The number of pressing operations Y for the driving mode selector button 22 Is set to "0".

2. Where the automatic digging mode is selected:

Comparison is made between (i) an initial actual tractive force after correction F' which is the initial value of the actual tractive force after correction obtained at the time when the driving mode is switched to the automatic digging mode, (ii) the dial value set by the first dial switch 19A for determining the magnitude of a load on the blade 7, and (iii) a lower limit value. In the meantime, in order to gradually bring the actual tractive force close to the target tractive force $F_0$ which corresponds to the dial value, a temporary target tractive force $F_0$ is sequentially obtained from the following calculation, based on the cumulative value X of unit tractive force components Δw which are accumulated each time the routine program is executed. Time spent in repeatedly executing the routine program is 20 m seconds in this embodiment.

Figure 9:
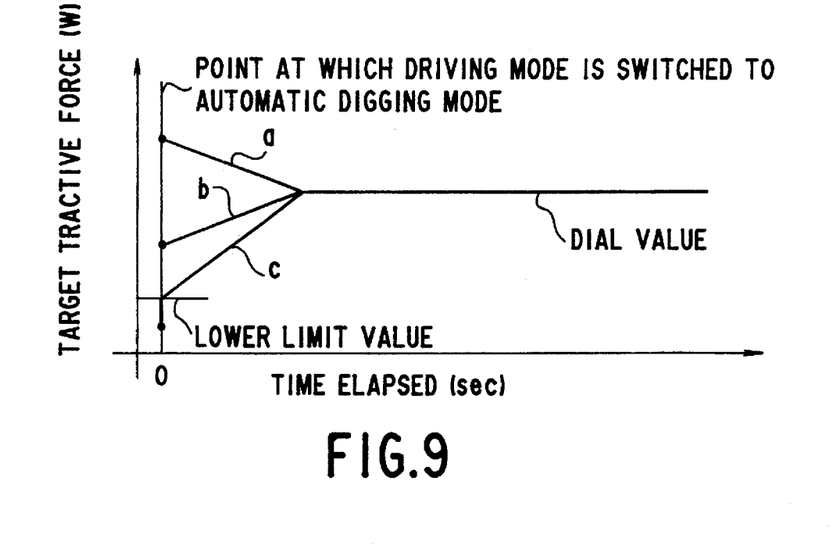
FIG. 9 is a graph showing a process in which an actual tractive force is gradually brought closer to a target tractive force corresponding to a load applied to a blade, the load being set by a dial switch when an automatic digging mode is selected.

(i) Where the initial actual tractive force after correction F' exceeds the dial value (see "a" in FIG. 9)

The temporary target tractive force $F_0$ ← the initial actual tractive force after correction F'—the cumulative value X (ii) Where the initial actual tractive force after correction F' is intermediate between the dial value and the lower limit value (see "b" in FIG. 9):

The temporary target tractive force $F_0$ ← the initial actual tractive force after correction F' + the cumulative value X (iii) Where the initial actual tractive force after correction F' is below the lower limit value (see "c" in FIG. 9):

The temporary target tractive force $F_0$ ← the lower limit value + the cumulative value X The temporary target force $F_0$ is repeatedly obtained by the above calculation until the temporary target tractive force $F_0$ becomes equal to a tractive force corresponding to the dial value set for determining the magnitude of a load on the blade 7, and at the time that the temporary target tractive force $F_0$ becomes equal to the tractive force corresponding to the dial value, this tractive force is set as a target tractive force $F_0$.

The reason for setting the lower limit value is that if the calculation for obtaining the temporary target force $F_0$ is started when the actual tractive force is too small with the cutting edge of the blade 7 scarcely touching the ground, lifting and lowering of the blade 7 cannot be stably controlled.

3. Where the automatic carrying mode is selected:

A specified value α (0.1 to 0.2 W in this embodiment) is subtracted from the dial value set by the first dial switch 19A for determining the magnitude of a load on the blade 7. The value thus obtained is set as a target tractive force $F_0$.

Step 24 to Step 27: A dial value, which is set by the second dial switch 19B for correcting the dial value (i.e., the magnitude of a load on the blade 7) set by the first dial switch 19A, is added to or subtracted from the above set target tractive forces $F_0$ and the value thus corrected is set as a target tractive force $F_0$.

In case that the blade 7 is not manually operated by the blade control lever 18 if the brake is in a operating condition; if the torque convertor 33 is in a switched state, being switched from the lock-up (LU) state to the torque converting (TC) state or vice versa; or if the transmission 34 is in a shifted state, being shifted from the first forward speed (F1) to the second forward speed (F2) or vice versa, a specified value β (0.1 to 0.2 W in this embodiment) is added to the target tractive force $F_0$ corrected in the above step and the value thus obtained is set as a target tractive force $F_0$. The reason for adding 0.1 to 0.2 W herein is as follows. When the speed of the bulldozer 1 is abruptly reduced by a load caused by operating the brake and this is detected as a shoe slip; when the torque convertor 33 is in the switched state; or when the transmission 34 is in the shifted state, the actual tractive force decreases causing a decrease in the load applied to the blade 7. In order to prevent the rise of the blade 7 caused by the decrease of the load, 0.1 to 0.2 W is added.

Step 28 to Step 32: First, tractive force difference $\Delta F$ which is the difference between the target tractive force $F_0$ and the actual tractive force after correction F is obtained, and the display unit 21 displays whether the manual operation mode, automatic digging mode or the automatic carrying mode is selected in dozing operation. Then, the shoe slip (i.e., running slip) of the vehicle body 2 is detected as "running slip", based on the following conditions, from the moving average acceleration and the actual tractive force after correction F. The moving average acceleration is obtained by applying the method of moving averages to the acceleration of the vehicle body 2 which has been obtained from the acceleration components derived from the pitch angle data by frequency separation.

1. If either of the following conditions is satisfied, the occurrence of running slip is admitted.

(1°≈0.0174G, W: the total weight of the bulldozer 1)

(1) the moving average acceleration $\tau < -4°$ or (2) the moving average acceleration $\tau < -2°$ and the actual tractive force after correction F>0.6 W 2. If either of the following conditions is satisfied, it is admitted that running slip has stopped after occurrence.

(1) the moving average acceleration $\tau > 0.1°$ or (2) the actual tractive force after correction F>the actual tractive force after correction at the time of the start of running slip F - 0.1 W After judging whether or not running slip has occurred based on the foregoing conditions, either of the following steps will be taken in accordance with the judgment.

1. If it is judged that running slip has occurred, a lift operation amount $Q_S$ for lifting the blade 7 is obtained from a slip control characteristic map (not shown) in order to eliminate the running slip by reducing load applied to the blade 7.

Figure 10:
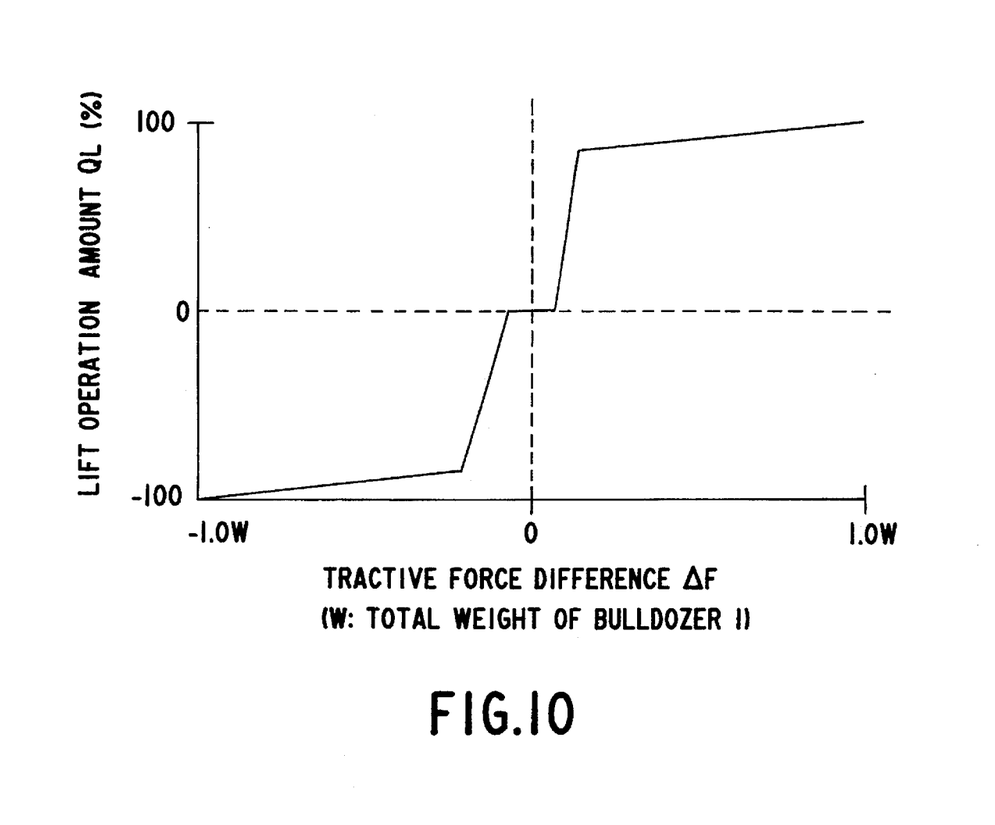
FIG. 10 is a graph showing a load control characteristic line.

2. If it is judged that no running slip has been detected, a lift operation amount $Q_L$ for lifting or lowering the blade 7 such that the actual tractive force after correction F becomes equal to the target tractive force $F_0$ is obtained from a load control characteristic map shown in FIG. 10, using the tractive force difference $\Delta F$ between the target tractive force $F_0$ and the actual tractive force after correction F.

When the voltage of the power source is not normal, being less than the specified value and the electronic circuit and so on functions being abnormal; when the transmission 34 is in other gear conditions than the first forward speed (F1) and the second forward speed (F2); when the manual operation mode is selected; or when the blade 7 is manually operated by the blade control lever 18, a lift operation amount $Q_N$ for lifting or lowering the blade 7 is obtained from a manual control characteristic map (not shown), according to the operation amount of the blade control lever 18 in Step 33.

The data on the above-mentioned lift operation amounts $Q_S$, $Q_L$ and $Q_N$ are supplied to the blade lift cylinder controller 47 which actuates the blade lift cylinders 11 through the lift valve actuator 48 and the lift cylinder operation valve 49 in accordance with the lift operation amounts $Q_S$, $Q_L$ and $Q_N$, thereby performing the desired control of lifting or lowering the blade 7.

In the foregoing embodiment, the invention has been particularly described with the power transmission system equipped with the torque convertor 33 having a lock-up mechanism, but the invention is not necessarily limited to this as it may be applied to cases where a torque convertor having no lock-up mechanism or a direct transmission having no torque convertor is employed. When such a direct transmission is employed, the actual tractive force is calculated in the same way as described in the case of "lock-up" in the foregoing embodiment.

Further, in the embodiment, the running slip of the vehicle body 2 is detected by deriving acceleration components by frequency separation from the pitch angle data output from the pitch angle sensor 42, it may be detected from an output from an independent acceleration sensor, the output indicating the accelerated condition of the vehicle body 2. Alternatively, a Doppler speed meter may be employed and the running slip is detected by comparing the actual speed of the vehicle body 2 measured by the Doppler speed meter with the traveling speed of the crawler belts 5 used for running the vehicle body 2.

In the embodiment, when the manual operation mode or the automatic carrying mode is switched to the automatic digging mode, lifting or lowering of the blade is controlled such that the actual tractive force gradually comes closer to the target tractive force $F_0$, but the same blade control may be performed when the manual operation mode or the automatic digging mode is switched to the automatic carrying mode.

In the above embodiment, there are provided a pair of dial switches 19A and 19B for setting and correcting a load to be applied to the blade 7 when the automatic digging mode is selected, and for setting a load to be applied to the blade 7 at the time of the automatic carrying mode, the specified value α is subtracted from the set load for the automatic digging mode and after the value thus obtained is corrected by addition or subtraction, the corrected value is automatically set. However, another pair of dial switches may be provided for the automatic carrying mode. Alternatively, there may be provided a pair of dial switches for setting and correcting a load to be applied to the blade 7 when the automatic carrying mode is selected, and the load on the blade 7 for the automatic carrying mode is set through the use of these dial switches and after adding the specified value α to the above set load, the load may be automatically set as the load on the blade 7 for the automatic digging mode. Instead of the dial switches 19A and 19B, ten key switches may be employed. In such a case, it is desirable to display the loads set by the ten key switches on the display unit 21.

Although the above embodiment employs the driving mode selector button 22 for switching between the manual operation mode, the automatic digging mode and the automatic carrying mode in dozing operation and so on, a grip type sector switch, twisting type selector switch or rotary selector switch may be used instead of the driving mode selector button 22.

It is possible in the embodiment that the first dial switch 19A is used as a soil property mode switch for selecting property of the soil to be dug such as, for example, sandy soil, gravel soil or soft rock and the load to be applied to the blade 7 is set in accordance with the selected soil property mode.

Further, in the embodiment, the set magnitude of a load on the blade 7 may be possibly increased or decreased by learning function such as to obtain an optimum frequency for the running slip (shoe slip) of the vehicle body 2 of the bulldozer 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dozing control unit for a bulldozer, comprising:
   (a) actual tractive force detector means for detecting an actual tractive force of a vehicle body;
   (b) driving mode switching means capable of switching from a manual operation mode to an automatic driving mode in a dozing operation; and
   (c) blade controller means, operably connected to said driving mode switching means and to a blade, for controlling said blade to be lifted or lowered based on whether or not there is a difference between the actual tractive force detected by the actual tractive force detector means and a target tractive force set for the automatic driving mode when the manual operation mode is switched to the automatic driving mode by the driving mode switching means, wherein the blade controller means controls a lifting or lowering of the blade such that the actual tractive force gradually and incrementally comes closer to coinciding with the target tractive force when said difference exists between the actual tractive force and the target tractive force.

2. The dozing control unit for a bulldozer as claimed in claim 1, further comprising target tractive force setting means for setting a target tractive force at the time of the automatic driving mode.

3. The dozing control unit for a bulldozer as claimed in claim 1 or 2, wherein the automatic driving mode is an automatic digging mode associated with digging in dozing operation or an automatic carrying mode associated with carrying in dozing operation.

4. The dozing control unit for a bulldozer as claimed in claim 1, wherein there are provided at least an automatic digging mode associated with digging and an automatic carrying mode associated with carrying in dozing operations, as the automatic driving mode.

5. The dozing control unit for a bulldozer as claimed in claim 1, further comprising target tractive force setting means for setting a target tractive force when the automatic digging mode is selected and another target tractive force setting means for setting a target tractive force when the automatic carrying mode is selected.

6. The dozing control unit for a bulldozer as claimed in claim 4, wherein a target tractive force at the time of the automatic carrying mode is set a predetermined amount smaller than a target tractive force at the time of the automatic digging mode.

7. The dozing control unit for a bulldozer as claimed in claim 6, which further comprises target tractive force setting means for setting a target tractive force when the automatic digging mode is selected, in which a tractive force obtained by subtracting the predetermined amount from the target tractive force set by the target tractive force setting means for the automatic digging mode is automatically set as a target tractive force for the automatic carrying mode.

8. The dozing control unit for a bulldozer as claimed in claim 6, which further comprises target tractive force setting means for setting a target tractive force when the automatic carrying mode is selected, in which a tractive force obtained by adding the predetermined amount to the target tractive force set by the target tractive force setting means for the automatic carrying mode is automatically set as a target tractive force for the automatic digging mode.

9. The dozing control unit for a bulldozer as claimed in claim 1, wherein the actual tractive force detector means includes an engine revolution sensor for detecting a revolution speed Ne of an engine and a torque convertor output shaft revolution sensor for detecting a revolution speed Nt of an output shaft of a torque convertor, and the actual tractive force of the vehicle body is detected by such a calculation that: a speed ratio e (= Nt/Ne), which is the ratio of the engine revolution speed Ne detected by the engine revolution sensor to the torque convertor output shaft revolution speed Nt detected by the torque convertor output shaft revolution sensor, is first obtained; torque convertor output torque is obtained from the torque convertor characteristic of the torque convertor, using the speed ratio e; and the torque convertor output torque thus obtained is multiplied basically by a reduction ratio between the output shaft of the torque convertor and sprockets for driving crawler belts used for running the vehicle body.

10. The dozing control unit for a bulldozer as claimed in claim 1, wherein the actual tractive force detector means includes an engine revolution sensor used for detecting a revolution speed of an engine when a torque convertor with a lock-up mechanism is locked up or when a direct transmission is employed, and the actual tractive force of the vehicle body is detected by such a calculation that: engine torque is first obtained from the engine torque characteristic of the engine, using the revolution speed of the engine detected by the engine revolution sensor; and then the engine torque thus obtained is multiplied basically by a reduction ratio between the engine and sprockets for driving crawler belts used for running the vehicle body.

11. The dozing control unit for a bulldozer as claimed in claims 9 or 10, wherein the actual tractive force detector means further includes a pitch angle sensor for detecting the pitch angle of the vehicle body inclining in forward and backward directions, and an actual tractive force detected based on the pitch angle detected by the pitch angle sensor is corrected.

12. The dozing control unit for a bulldozer as claimed in any one of claims 1, 2, 4, 5, 6, 7 or 8, wherein the driving mode switching means comprises a push button selector switch, grip-type selector switch, twisting-type selector switch or rotary selector switch.

13. The dozing control unit for a bulldozer as claimed in any one of claims 2, 5, 7 and 8, wherein the target tractive force setting means comprises a dial switch or ten key switch.

14. The dozing control unit for a bulldozer as claimed in any one of claims 2, 5, 7 and 8, further comprising target tractive force correcting means for correcting the target tractive force set by the target tractive force setting means.

15. The dozing control unit for a bulldozer as claimed in claim 14, wherein the target tractive force setting means and the target tractive force correcting means respectively comprises a dial switch or ten key switch.

16. The dozing control unit for a bulldozer as claimed in any one of claims 1, 2, 4, 5, 6, 7 or 8, wherein the lifting or lowering control of the blade by the blade controller means is not performed when the blade is in manual operation, but performed when the blade is in the automatic driving mode and a first forward speed or an intermediate forward speed is selected.

* * * * *